(12) United States Patent
Zamer

(10) Patent No.: US 10,930,043 B2
(45) Date of Patent: Feb. 23, 2021

(54) USING AUGMENTED REALITY FOR ELECTRONIC COMMERCE TRANSACTIONS

(71) Applicant: PAYPAL, INC., San Jose, CA (US)

(72) Inventor: Kamal Zamer, Austin, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/736,574

(22) Filed: Jan. 7, 2020

(65) Prior Publication Data

US 2020/0279421 A1    Sep. 3, 2020

Related U.S. Application Data

(63) Continuation of application No. 15/889,151, filed on Feb. 5, 2018, now Pat. No. 10,529,105, which is a
(Continued)

(51) Int. Cl.
*G06K 9/00* (2006.01)
*G06Q 20/12* (2012.01)
(Continued)

(52) U.S. Cl.
CPC .......... *G06T 11/60* (2013.01); *G06K 9/00624* (2013.01); *G06K 9/00671* (2013.01); *G06Q 20/12* (2013.01); *G06Q 20/322* (2013.01); *G06Q 20/40* (2013.01); *G06Q 30/0609* (2013.01); *G06Q 30/0623* (2013.01); *G06Q 30/0635* (2013.01); *G06Q 30/0641* (2013.01); *G06Q 30/0643* (2013.01); *G06T 3/4038* (2013.01);
(Continued)

(58) Field of Classification Search
CPC ............ G06K 9/00624; G06K 9/00671; G06T 19/006; G06T 3/4038; G06T 7/70; G06T 11/00; G06T 11/60; G06Q 20/12; G06Q 20/322; G06Q 20/40; G06Q 30/0609; G06Q 30/0623; G06Q 30/0635; G06Q 30/0641; G06Q 30/0643; H04L 67/18; H04L 67/20
USPC ........................................................ 345/633
See application file for complete search history.

(56) References Cited

U.S. PATENT DOCUMENTS 5,880,773 A    3/1999 Suzuki
6,034,653 A    3/2000 Robertson et al.
(Continued)

OTHER PUBLICATIONS

"Augmented reality makes shopping more personal," Retrieved from the Internet: <URL: https://web.archive.org/web/20160530075426/ http://www.research.ibm.com/articles/augmented-reality.shtml>, Dated May 30, 2016.
(Continued)

*Primary Examiner* — Jin Cheng Wang
(74) *Attorney, Agent, or Firm* — Haynes and Boone LLP

(57) ABSTRACT

Systems, methods, and computer program products for identifying objects of interest and providing relevant information about the objects of interest using augmented reality devices are disclosed. For example, a computer-implemented method may include identifying an object of interest among a plurality of objects present in an image view, determining real-time information for the object of interest based on the identifying, presenting the determined real-time information for the object of interest as part of the image view, and processing a transaction involving the object of interest based on a user selection associated with the image view.

20 Claims, 5 Drawing Sheets

Related U.S. Application Data continuation of application No. 15/406,570, filed on Jan. 13, 2017, now Pat. No. 9,886,786, which is a continuation of application No. 13/804,063, filed on Mar. 14, 2013, now Pat. No. 9,547,917.

(51) Int. Cl.

| | | |
|---|---|---|
| G06Q 20/32 | (2012.01) | |
| G06Q 20/40 | (2012.01) | |
| G06Q 30/06 | (2012.01) | |
| G06T 11/00 | (2006.01) | |
| G06T 11/60 | (2006.01) | |
| G06T 19/00 | (2011.01) | |
| G06T 3/40 | (2006.01) | |
| G06T 7/70 | (2017.01) | |
| H04L 29/08 | (2006.01) | |

(52) U.S. Cl.
CPC .............. *G06T 7/70* (2017.01); *G06T 11/00* (2013.01); *G06T 19/006* (2013.01); *H04L 67/18* (2013.01); *H04L 67/20* (2013.01)

(56) References Cited

U.S. PATENT DOCUMENTS

| | | | |
|---|---|---|---|
| 7,899,252 | B2 | 3/2011 | Boncyk et al. |
| 8,433,722 | B2 | 4/2013 | Shin et al. |
| 8,547,401 | B2 | 10/2013 | Boncyk et al. |
| 8,606,647 | B2 | 12/2013 | Sines |
| 8,712,193 | B2 | 4/2014 | Boncyk et al. |
| 8,733,927 | B1 | 5/2014 | Lewis |
| 8,971,023 | B2 | 3/2015 | Olsson et al. |
| 9,147,290 | B2 | 9/2015 | Kim |
| 9,153,074 | B2 | 10/2015 | Zhou et al. |
| 9,165,382 | B2 | 10/2015 | Song et al. |
| 9,330,499 | B2 | 5/2016 | Perez et al. |
| 9,449,340 | B2 | 9/2016 | Argue et al. |
| 9,886,786 | B2 * | 2/2018 | Zamer ................ G06K 9/00671 |
| 10,008,037 | B1 | 6/2018 | Worley, III |
| 2005/0248722 | A1 | 11/2005 | Nelis |
| 2005/0285878 | A1 | 12/2005 | Singh et al. |
| 2005/0289590 | A1 | 12/2005 | Cheok et al. |
| 2010/0088026 | A1 | 4/2010 | Manolescu |
| 2010/0185529 | A1 | 7/2010 | Chesnut et al. |
| 2010/0199232 | A1 | 8/2010 | Mistry et al. |
| 2011/0246276 | A1 * | 10/2011 | Peters ................ G06Q 30/0223 705/14.24 |
| 2011/0316845 | A1 | 12/2011 | Roberts et al. |
| 2012/0044263 | A1 | 2/2012 | Kim et al. |
| 2012/0050144 | A1 | 3/2012 | Morlock |
| 2012/0078667 | A1 * | 3/2012 | Denker ............. G06Q 30/0643 705/5 |
| 2012/0092370 | A1 | 4/2012 | Oh et al. |
| 2012/0190346 | A1 | 7/2012 | Kim |
| 2012/0229657 | A1 | 9/2012 | Calman et al. |
| 2012/0230548 | A1 | 9/2012 | Calman et al. |
| 2012/0231814 | A1 | 9/2012 | Calman et al. |
| 2012/0232937 | A1 | 9/2012 | Calman et al. |
| 2012/0232976 | A1 | 9/2012 | Calman et al. |
| 2012/0232977 | A1 * | 9/2012 | Calman .............. G06Q 30/0251 705/14.25 |
| 2012/0233025 | A1 * | 9/2012 | Calman .................. H04W 4/70 705/26.61 |
| 2012/0233070 | A1 | 9/2012 | Calman et al. |
| 2012/0256956 | A1 | 10/2012 | Kasahara |
| 2012/0306907 | A1 | 12/2012 | Huston |
| 2012/0320088 | A1 | 12/2012 | Ihara et al. |
| 2013/0031202 | A1 | 1/2013 | Mick et al. |
| 2013/0033522 | A1 | 2/2013 | Calman |
| 2013/0036371 | A1 | 2/2013 | Cohen |
| 2013/0044042 | A1 | 2/2013 | Olsson et al. |
| 2013/0113827 | A1 * | 5/2013 | Forutanpour .......... G06T 11/00 345/633 |
| 2013/0125027 | A1 | 5/2013 | Abovitz |
| 2013/0144482 | A1 | 6/2013 | Tuukkanen |
| 2013/0155107 | A1 * | 6/2013 | Ashour .............. H04N 1/00244 345/633 |
| 2013/0159196 | A1 * | 6/2013 | DiZoglio ............... G06Q 20/20 705/72 |
| 2013/0166332 | A1 | 6/2013 | Hammad |
| 2013/0191250 | A1 | 7/2013 | Bradley et al. |
| 2013/0191708 | A1 | 7/2013 | Song |
| 2013/0218721 | A1 | 8/2013 | Borhan |
| 2013/0268304 | A1 | 10/2013 | Doshi |
| 2013/0293580 | A1 | 11/2013 | Spivack |
| 2013/0293584 | A1 | 11/2013 | Anderson |
| 2014/0009494 | A1 | 1/2014 | Kasahara |
| 2014/0063064 | A1 | 3/2014 | Seo et al. |
| 2014/0095223 | A1 | 4/2014 | Oxenham et al. |
| 2014/0098128 | A1 | 4/2014 | Fein et al. |
| 2014/0100997 | A1 | 4/2014 | Mayerle |
| 2014/0129354 | A1 * | 5/2014 | Soon-Shiong ..... G06K 9/00624 705/16 |
| 2014/0163861 | A1 | 6/2014 | Beaurepaire et al. |
| 2014/0188527 | A1 | 7/2014 | Oxenham |
| 2014/0236767 | A1 | 8/2014 | Duggal |
| 2014/0237578 | A1 | 8/2014 | Bryant |
| 2016/0171306 | A1 | 6/2016 | Calman |

OTHER PUBLICATIONS

"Your personal shopping assistant," Jan. 2, 2012, IBM Research Blog, https://www.ibm.com/blogs/research/2012/07/your-personal-shopping-assistant/.

Brody et al., "Pocket BargainFinder: A Handheld Device for Augmented Commerce," Handheld and Ubiquitous Computing, 1999, pp. 44-51, vol. 1707, Springer Berlin Heidelberg.

Rash, "IBM Launches Augmented Reality Shopping Assistant at CeBIT," eWeek, Mar. 4, 2013, http://www.eweek.com/cloud/ibm-launches-augmented-reality-shopping-assistant-at-cebit.

Zhu et al., "Personalized In-Store E-Commerce with the PromoPad: an Augmented Reality Shopping Assistant," Electronic Journal for E-commerce Tools and Applications, 2004, pp. 1-19, 1(3).

* cited by examiner

USING AUGMENTED REALITY FOR ELECTRONIC COMMERCE TRANSACTIONS

CROSS REFERENCE TO RELATED APPLICATIONS

This application is a continuation of and claims priority to U.S. patent application Ser. No. 15/889,151, filed Feb. 5, 2018, which is a continuation of U.S. patent application Ser. No. 15/406,570, filed Jan. 13, 2017, now U.S. Pat. No. 9,886,786, issued Feb. 6, 2018, which is a continuation of U.S. patent application Ser. No. 13/804,063, filed Mar. 14, 2013, now U.S. Pat. No. 9,547,917, issued Jan. 17, 2017, all of which are incorporated herein by reference in their entirety.

BACKGROUND

Technical Field

Embodiments of the present disclosure generally relate to information systems, and more particularly, to methods and systems for using augmented reality to determine information.

Related Art

Users may regularly use mobile devices to look for information of all types, including, for example, to search for information on locations or descriptions of businesses, products, services, private or public facilities such as bus stations, and many other types of information. However, current information found, for example, via searches on mobile devices, may be very broad, outdated, and, in many cases, not relevant to a user's needs or situation.

BRIEF DESCRIPTION OF THE FIGURES

Like element numbers in different figures represent the same or similar elements.

DETAILED DESCRIPTION

In accordance with various embodiments described herein, methods and systems are provided for using augmented reality to determine information. In one or more embodiments, a user device having a general viewer and an application for using augmented reality (hereinafter referred to as an augmented reality device or "AR device") may be used to determine current or real time information such as location, destination, description, or any other information pertaining to one or more objects, moving or stationary, which are viewable via the general viewer of the AR device.

An AR device may be a user device such as a mobile device including for example a smart phone, a tablet, a laptop, or the like, which includes a viewer (e.g., a user interface such as an image or video capturing component, e.g., a camera, a screen, a display, etc.) that may provide a user of the AR device a view and insight to an object. In various embodiments, an AR device may include smart glasses or goggles or other appropriate devices having a viewer as part of the device. For example, an AR device may include smart glasses such as Google® glasses or any other devices having connection capabilities to networks such as the Internet. By looking at an object through a viewer of an AR device such as a smart phone or smart glasses, a user may determine real time information about the object. In other embodiments, an AR device may include any device that is wearable and "smart", for example, a "smart watch" such that a user may hold the "smart watch" towards an object such as a moving object of interest and have relevant information about the object, which may be displayed on the "smart watch" itself. Advantageously, according to one or more embodiments herein, the user may be provided with current or updated real time information such that the user may determine whether the information is relevant to his or her situation or needs.

According to one or more embodiments, an application for an AR device may be provided by a service provider or any appropriate party such that users may choose to download or install and run the application on their AR devices. The application may be provided by a service provider such as PayPal® and/or eBay® of San Jose, Calif.

There are many use cases in which augmented reality may be used for determining information. In an example, an AR device may provide a user a view and insight showing information about the nearest means of public transport (e.g., a bus, train, taxi, car, boat, jetski, or a similar service) at a current user location and providing the user with details such as routes, times, fares, etc. for a selected public transport. The user may also select to conduct a transaction, e.g., pay for fares or tickets, associated with the public transport using the AR device.

Figure 1:
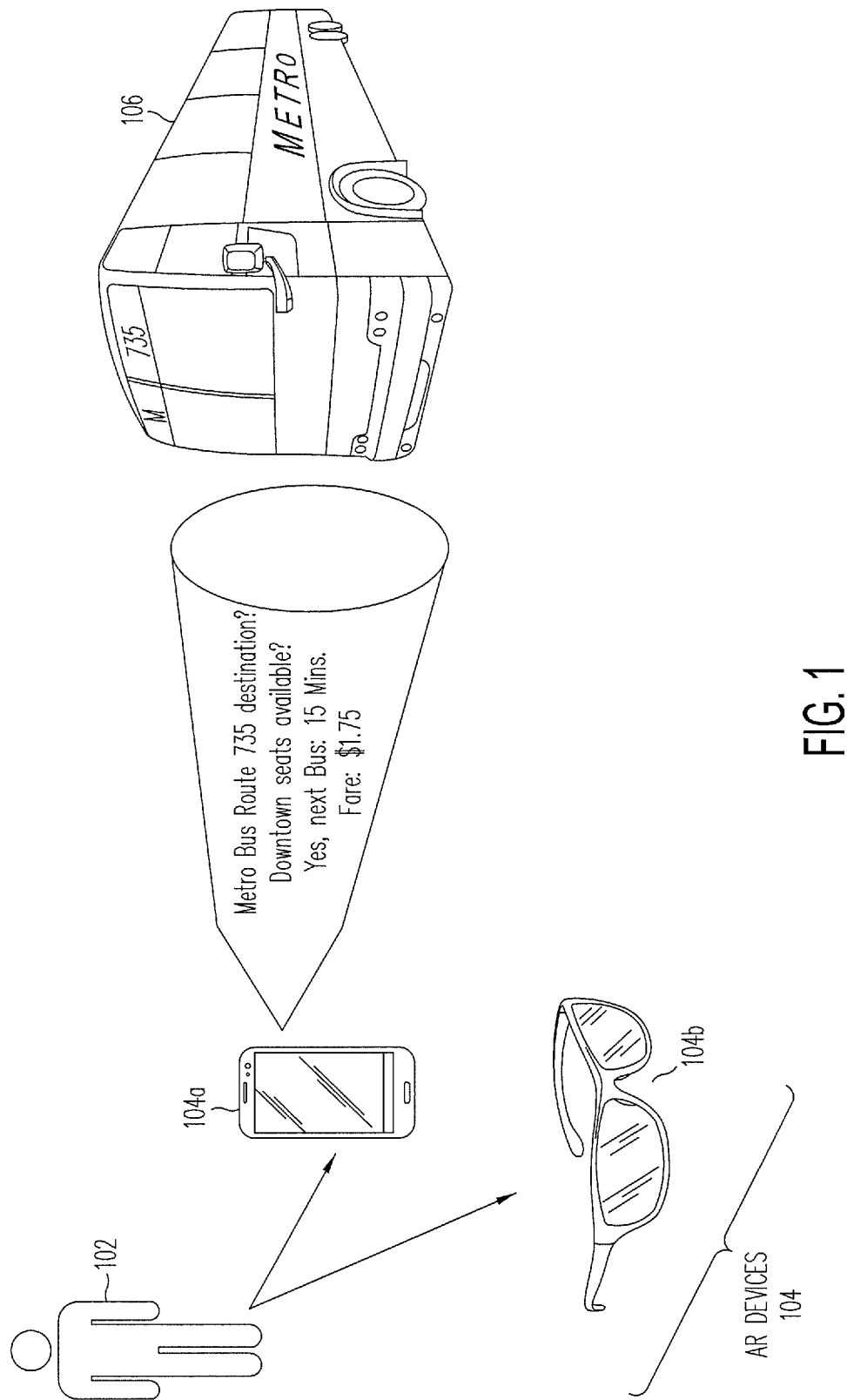
FIG. 1 is a diagram illustrating a system for using augmented reality to determine information about a moving object according to an embodiment of the present disclosure.
Figure 1A:
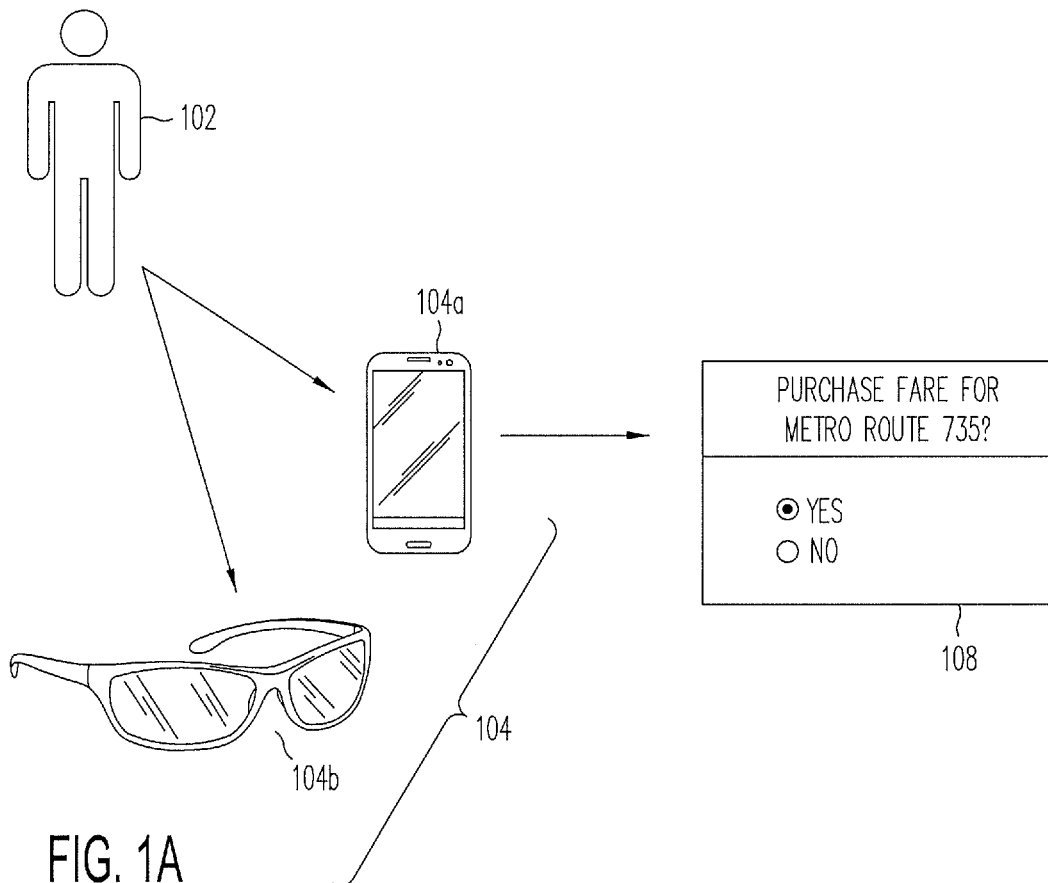
FIG. 1A is a diagram illustrating conducting a transaction in connection with the system of FIG. 1 according to an embodiment of the present disclosure.

Referring now to the drawings wherein the showings are for purposes of illustrating embodiments of the present disclosure only, and not for purposes of limiting the same, FIGS. 1 and 1A illustrate a set of diagrams for using augmented reality to determine information about moving objects according to an embodiment of the present disclosure.

In a general example, a user that is waiting at a bus stop may see a bus approaching him or her. The user may want to know when the next bus will arrive. The user may look through the user's AR device's viewer (e.g., user interface or UI, camera, etc.) to immediately determine when the next bus will arrive. By using location services (e.g., GPS) of the user's AR device, the user may have the ability to look at any transport vehicle such as a bus, train or plane to determine the route of the transport vehicle, and the current destination of that particular transport vehicle. The user may also find out the fare/price to ride on the transport vehicle and even purchase the fare right from the user's AR device in a seamless manner. As such, the user may board the transport vehicle (e.g., bus) immediately. The user immediately knows if the transport vehicle is relevant to his or her needs or situation.

In the embodiment of FIG. 1, a user 102 may have a user device or AR device 104, for example, a smart phone 104a or smart glasses 104b, or any other appropriate device including a wearable device. User 102 may see, through a viewer of an AR device 104, a target object such as a transport vehicle 106, e.g., a bus, in the distance.

User 102 may be interested in obtaining information about transport vehicle 106 and may use AR device 104 to determine information about transport vehicle 106. In an embodiment where transport vehicle 106 is a bus, user 102 may be interested in knowing information about the bus including, for example: the particular route or direction of the bus, the fare of the bus, when the next bus will come in case user 102 wants to wait for a friend so they can take the bus together, etc. In one example, the information obtained about the bus may indicate that transport vehicle 106 is Metro Bus, Route 735; Destination? Downtown; Seats Available? Yes; Next Bus: 15 minutes; Fare: $1.75, etc. As such, user 102 may discover information about transport vehicle 106, e.g., a bus, which is approaching or heading in a direction towards the user.

In an embodiment, the AR device 104 and a target object such as transport vehicle 106 (e.g., bus) may make a connection and be able to share data with each other via networks such as existing wireless networks. In other embodiments, infrared data transfer may be used if user 102 has a direct line of sight of a target object such as transport vehicle 106. In that regard, the target object, which in this embodiment is transport vehicle 106, may have a system for communicating updated or real time information, for example, by transmitting or broadcasting signals (e.g., beaconing) via a wireless communications system such as WiFi, Bluetooth, etc. In other examples, transport vehicle 106 may use other technologies or sensors to convey information such as NFC, RFID, IR, readable or scannable codes attached thereon such as a QR code, etc., which AR device 104 is able to detect, read, scan, etc.

In one or more embodiments, locations such as business locations or transport vehicle terminals themselves, for example, bus stops, may use technologies or sensors to convey information about associated transport vehicles such as readable or scannable codes, e.g., QR codes, placed on one or more appropriate locations, e.g. on a wall or surface of the bus stop. As such, in embodiments herein, each bus stop may emit active, real time information (as opposed to current technologies that may simply show, for example, a regular bus schedule) such that an AR device viewer may look and determine information relevant for the present moment, e.g., an updated or current bus schedule for the moment (e.g., reflecting delays, changes in routes, destination or equipment, etc.).

As such, a system for communicating information, for example, public information about a transport vehicle may be dynamic such that the information may be updated and provided in real time. For example, information may be updated real time for specific locations based on dynamic situations or circumstances such as a history of purchases, user-provided communications or inputs, public traffic information, road closures, events, mechanical failures, etc. In this regard, communications such as wireless communications (e.g., WiFi, Bluetooth, etc.), IR, readable codes (e.g., QR code), NFC, RFID technologies, etc. may be updated dynamically to reflect real time information, that is, signals may be transmitted and updated with dynamic information. The information may be managed in several ways, for example, a long range communication network may be used, information may be stored in the cloud, or it may be managed by a service.

In various embodiments, once user 102 determines that he or she would like to ride a transport vehicle such as transport vehicle 106, user 102 may want to purchase a ticket to ride.

Referring to FIG. 1A, user 102 may choose to conduct a transaction in connection with transport vehicle 106. In this regard, user 102 may purchase a ticket to ride approaching vehicle transport 106 using AR device 104. For example, on a user interface 108 of AR device 104, an option to purchase a ticket may be displayed therein. In this example, as displayed on user interface 108, user 102 may select to purchase a fare for this particular transport vehicle, e.g., Metro Route 735.

In various embodiments, user 102 may conduct the transaction, for example, purchase a ticket to ride a bus using a transaction card, a payment provider service such as PayPal®, or other forms of payment as generally accepted in financial transactions.

Figure 2:
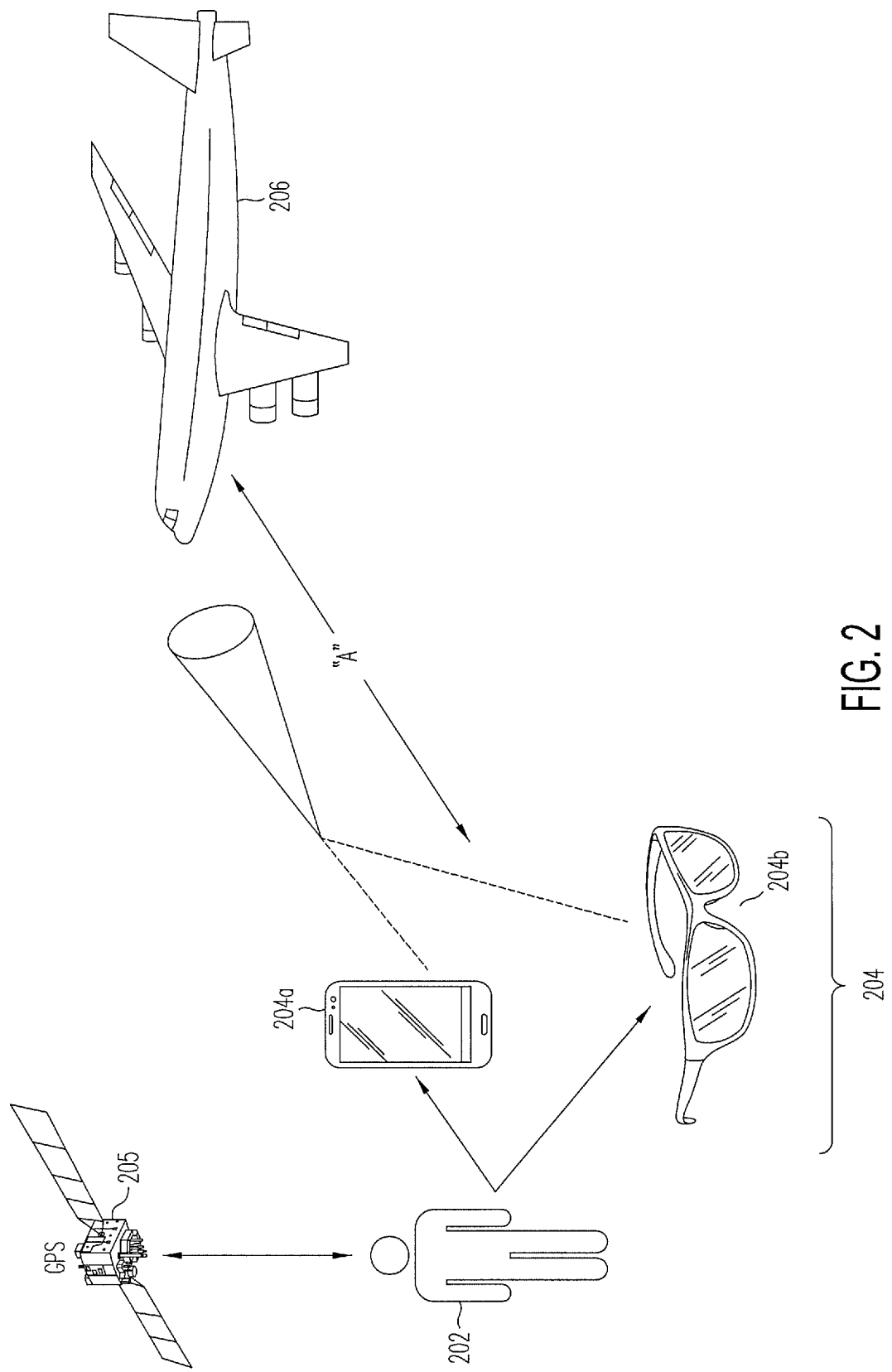
FIG. 2 is a diagram illustrating a system for using augmented reality to determine information about a moving object according to another embodiment of the present disclosure.

Referring to FIG. 2, a diagram illustrates a system for using augmented reality to determine information about a moving object according to another embodiment of the present disclosure.

In a general example, a user may look at an air plane coming into the airport via a viewer of the user's AR device and determine if it is the flight that the user's loved ones are on. The user's AR device may be able to determine whether the air plane being viewed via the AR device's viewer is the correct flight based on factors such as the location of the user, where the AR device viewer is looking in the sky, and the flight patterns of air planes at that specific point in time.

In the embodiment of FIG. 2, first, a user 202 having a user device or AR device 204, for example, a smart phone 204a or smart glasses 204b, may see or capture, through a viewer of AR device 204, an image view where user 202 is looking via AR device 204. In that regard, the image view may be deconstructed to identify a moving object such as a transport vehicle 206, e.g., an air plane, in the distance. In one example, if the image is clear enough, even the name of the airline may be identified. A distance "A" between AR device 204 and a moving object such as transport vehicle 206 (e.g., air plane) may be determined based, at least in part, on image recognition.

Second, a location of user 202 may be determined via global positioning services such as GPS 205 of AR device 204.

Third, the location of user 202 may be mixed with current flying flights information.

AR device 204 may determine information about current flying flights including the particular transport vehicle 206. In that regard, in a case where the moving object is a plane, information about the plane such as plane type and airline, route, scheduled departure/arrival times, current status, etc. may be determined. For example, public information from the FAA may give tracking information of current flights in the sky. The determined information about an air plane or flight may include: plane type/airline/flight number (e.g., Boeing 737/Southwest Airlines/SA 195); route (e.g., JFK-AUS); scheduled arrival time (e.g., 4:25 PM CST); status (e.g., On Time). As such, in this example, transport vehicle 206 may be a Boeing 737 airplane, such that AR device 204 may access information (e.g., by accessing FAA public information) about all Boeing 737 airplanes in flight. In an example, an application such as "Flight Aware" may be used to determine flight status of particular flights. The paths of flights as well as flight information may be analyzed such that current information is obtained for a particular flight. As such, the real time status of a plane may be determined.

In an example where an AR device has an application such as "Flight Aware", wherein such application may digest FAA flight information (which is updated in real time), the AR device may provide the user the current location of planes as they navigate their routes. As described above, the AR device may also determine a location of the user via its GPS location services. As such, the AR device knows the GPS location of the user and a location (e.g., GPS location) of the current flights in the "general viewing area" of a user. In this regard, the AR device may be able to filter or determine all the flights (e.g. by processing an algorithm or simple math) that are within viewing range of the user as indicated, for example, by GPS. Then the AR device may be adapted to take visual cues of an actual plane (e.g., determine the model of the plane, the airline, etc.).

Fourth, by using AR device 204 to look at a moving object such as transport vehicle 206 (e.g., a plane), user 202 may immediately determine information about the moving object including, for example, whether transport vehicle 206 is the flight that the user has been waiting for, or whether the moving object, e.g., transport vehicle 206, is relevant to the user.

As such, in this example, based on the location of the user, the location of the plane within the user's captured image view, and public information such as current FAA information that the AR device interacts with, the system may filter out the current possible flights and determine the actual flight the user cares about. If the plane in the user's image view matches the one the user cares about, then the plane may be considered a match and information about the plane/flight may be presented to the user through a user interface of the AR device, etc.

In an embodiment, the AR device may determine relevant information about a flight, for example, based on specific information such as where a loved one has sent a "flight confirmation purchase" receipt to the user, the AR device may determine that the user cares about a Southwest flight, specifically "SWA 714". If a plane flying above the user at that current location is a SWA flight, for example in view of the AR device, and flight SW 714 is in the viewing path of the user, then that is indeed the plane the user cares about because loved ones are on that flight.

In various embodiments, relevancy of information may be based on various factors or user or AR device specific information, including for example, location information, a user's personal calendar, user preferences, user behavior, user habits, purchase history (e.g., information about the user buying a plane ticket for a loved one such that the system knows the flight number and airline), user conversation history (e.g., email conversations), user input, etc. As such, the AR device may determine relevant information, for example, on which flight the user's loved ones are on, or any other information that is important to the user.

In an embodiment, the AR device may determine relevant information based on, for example, a user's personal calendar. For example, a calendar on the user's AR device may show that the user is attending an event downtown, and so the system may know that the user wants to reach a specific location. In another example, when a user looks at a transport vehicle via the user's AR device's viewer such as a bus, a cab (maybe the cab only goes to certain boroughs or neighborhoods), a train, etc., the system may determine if the transport vehicle routes reach the user.

Relevancy of information may also be based on user preferences. For example, when a user looks at a food truck, if the user is vegetarian, but the food truck is a hamburger truck, then the user may not want to have the food truck "highlighted" in his or her AR device augmented reality view nor look at the food truck's menu.

Relevancy of information may further be based on user behavior. For example, if the system notices that a user almost never takes a cab ride where the cab has less than half a tank of gas (maybe because the user has to travel a long distance during the trip), then the AR device may not highlight or include available cabs that do not match or are not in line with the user's behavior when the user attempts to digitally hail a cab.

As described above, for example with respect to mixing the location of the AR device and the target object, the system may provide relevant information to a user in situations where the user is unsure of the surroundings and does not know if, for example a plane in the sky pertains to the user, or if "that bus coming down the street" is going to be able to take the user to work, etc. Conversely, in some embodiments, location may not be as relevant, for example, when a food truck is down the street, the location may not matter that much; in that case, it may be more relevant to recognize the food truck's particular company, the menu, the number of customers waiting for food, the food reviews on the food truck, etc.

There are many other examples of use cases wherein an AR device may be used to look at a target object, moving or stationary, through a viewer of the AR device in order to determine information about the target object. Following are a few examples of use cases for using augmented reality to determine information.

Use Case 1: an AR device may determine dynamic, real time information about a food delivery truck captured via a viewer of the AR device. The food delivery truck may broadcast signals or have readable technologies such as RFID, NFC or a readable code such as a QR code communicating updated real time information such as a current menu, for example, including updated menu items, availability of items, prices, etc. In one example, Kamal is outside in his neighborhood and notices a specialty food delivery truck making a stop at a neighbor's house. Using his AR device viewer, Kamal may "look" at the delivery truck and see the menu of offerings from the delivery truck. Kamal may decide if he wants to order something from the delivery truck or reserve an appointment for the truck to visit his home so he may discuss other sales options with the delivery truck.

Use Case 2: Kamal is taking the bus to a concert downtown. Because there is a big event downtown, roads have been closed and the bus route is rerouted. When Kamal is waiting at the bus stop he may be able to see the new bus routes and decide if he wants to use the bus. Once Kamal is on the bus, the bus routes may change yet again. Using his AR device viewer, Kamal is able to see the new, rerouted bus route (including stops) so he may best judge where to request a stop of the bus.

Use Case 3: Kamal has finished his concert and is trying to take the bus home again. He is still downtown and the big event has still caused roads to close. Using his AR device viewer, Kamal may look up and down the street and different street corners to see designated zones for where buses are loading and unloading people. Kamal may also be able to see the bus routes for these designated zones so he knows which bus applies to him. Kamal may further be able to see when the next bus is scheduled to stop at the designated zone by looking at the zone himself (e.g., a countdown clock may be used for the designated zone). If there are no designated zones within Kamal's AR device viewer, he may be able to have a map displayed, which may show directions to the closest pickup/dropoff bus zone (e.g., using the GPS feature of his AR device).

Use Case 4: Kamal just misses his train and he sees it rush by. Using Kamal's AR device viewer he may be able to look at the train and know when the next train associated with that route is scheduled to stop so he can board the next train.

Use Case 5: A user may use his or her AR device to determine information about a taxi cab parked in front of the user, for instance, the user may want to know the taxi cab fares, which may be broadcasted by the taxi cab. In an embodiment, the taxi cab may also broadcast diagnostics, for example, how much gas is in the taxi cab, the tire air pressure, etc. such that a user may determine how safe the taxi cab is to ride.

Use Case 6: Kamal is visiting a new city and is not sure where he should hail a cab. Using his AR device viewer Kamal may be able to see designated "Hail a Cab" zones. Once Kamal navigates to a "Hail a Cab" zone, he may be able to digitally flag down a cab. Upon Kamal confirming his intent to take a cab, the nearest cab driver (e.g., based on GPS location locating an available cab) the cab driver may receive a text message or alert in his or her cab indicating Kamal is waiting for a cab. In an embodiment, Kamal may then instantly be presented with a "countdown" timer in his AR device viewer for when the cab is set to arrive. As such, the AR device may determine the closest location to most easily pick up a taxi cab, the location of designated pick up areas, fares for a nearby taxi cab, or any other pertinent information for the taxi cab.

Use Case 7: Kamal is in an airport in a foreign country where he does not speak the language. The airport has a rail system similar to Atlanta Hartsfield Jackson which moves commuters to different regions of the airport. When Kamal is waiting at a rail stop, he may want to know when he should get on the railcar. Using his AR device viewer, he knows which railcar to take so he can continue on his trip.

Use Case 8: Kamal has ordered a package from an e-commerce website and the package is shipping from a delivery service such as FedEx™ or UPS™. A package delivery truck such as FedEx™ or UPS™ may broadcast dynamic, real time information (e.g., within wireless communication range such as WiFi or Bluetooth) such that an AR device may determine whether a particular package is in the delivery truck. Kamal may use his AR device to look at any delivery truck such as a UPS™ vehicle and determine if the UPS™ vehicle he is viewing contains the item he has ordered. Kamal may walk up to the UPS™ vehicle and sign for his package right on the spot. If the UPS™ vehicle does not contain Kamal's package, Kamal may be presented with a view that shows which truck contains Kamal's package and the current location of the truck. This way, Kamal may determine when he needs to go home and sign for his package.

Use Case 9: Kamal is driving around residential neighborhoods right when the local school buses are dropping off students at their homes. Using Kamal's AR device viewer, Kamal may be able to look directly at a school bus in front of him and immediately know the route of the school bus. Once Kamal knows this, he may change his travel route so he may avoid the route of the school bus and hence more safely and easily reach his destination.

Use Case 10: It is a hot day and Kamal sees an ice cream truck coming down the street. Using his AR device viewer, Kamal may "look" at the ice cream truck and immediately determine what flavors of ice cream are for sale. Kamal may reserve and/or pay for his ice cream before the ice cream truck even stops.

Figure 3:
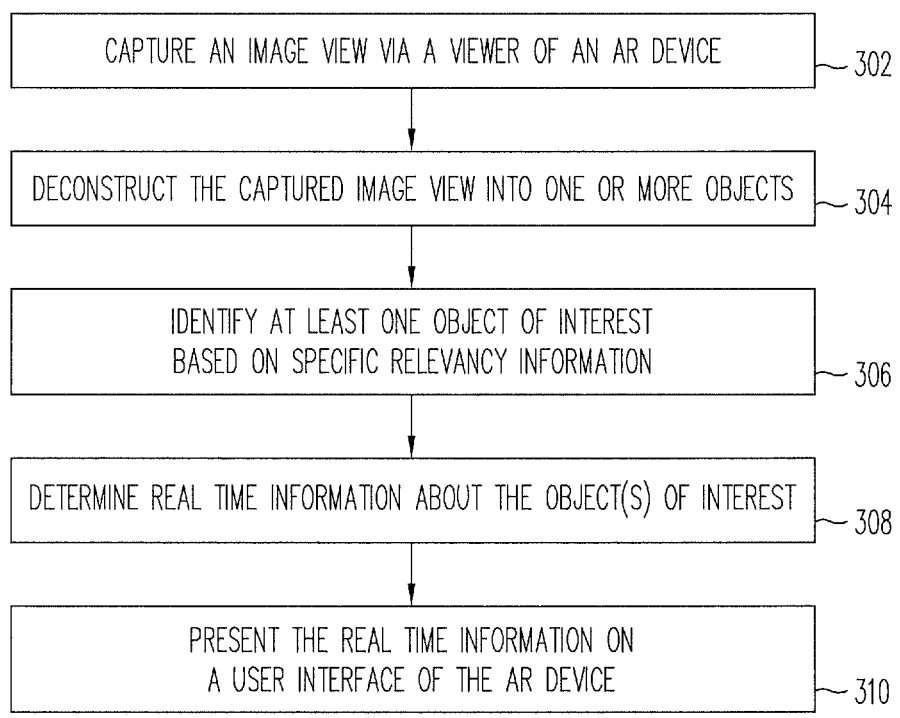
FIG. 3 is a flow diagram illustrating a method for using augmented reality to determine information according to an embodiment of the present disclosure.

Referring now to FIG. 3, a flow diagram illustrates a method for using augmented reality to determine information according to an embodiment of the present disclosure.

In block 302 an image view may be captured via a viewer of an AR device of a user having an AR information service enabled on the AR device. In that regard, an AR device may include a viewer such as a camera that may capture an image that includes one or more objects, areas or zones. The objects may include a mobile object such as a transport vehicle approaching a user of the AR device, or it may be a stationary object such as a transport vehicle parked in front of the user of the AR device. In other embodiments, the target object may be an area or zone, which may be associated with a particular item or service, for example, "Hail a Cab" zones, streets, or street corners to see designated loading/unloading zones for public transportation.

In block 304, the captured image view may be deconstructed into one or more different objects of potential interest to a user using, for example, image recognition. In various embodiments, once an image view including an object is captured via a viewer of the AR device, the system may use, for example, image recognition to determine key features of the image including the object to obtain related information. For example, once an image view is captured via a viewer of an AR device such as a smart phone camera, a smart glasses viewer, a smart watch viewer, etc., the image view may be deconstructed into key or important objects, parts or points of interest using image recognition.

In block 306, based on specific relevancy information such as user factors or user specific information in the AR device including, for example, user preferences (e.g., user is a vegetarian), user personal calendar (e.g. an appointment scheduled in 30 minutes), user habits (e.g., user always takes the bus in the morning), etc., one or more different objects of interest may be identified or sorted. The system may determine a key or important object of interest in the captured image view based on, for example information specific to the AR device or to the user at the current time.

In block 308, real time information may be determined about an object of interest. For example, to determine information, the AR information service may resolve communications with the object of interest based on the type of object, for example, either through direct communication via NFC, Bluetooth, WiFi, etc., or through indirect communication with the object of interest using publicly available information through, for example, APIs to the public service, using web scraping, etc. As such, the system may obtain real time information related to an object of interest via various ways including direct or indirect communications, or web scraping. In an embodiment, the image view including an object of interest, area or zone, may be transmitted to a server at a remote location, for example, a service provider server, to process related information. The system may then display the related information on a user's AR device about the captured object of interest, area or zone.

In block 310, the real time information may be presented to a user on a user interface, for example, on a screen or display of an AR device. Once a connection has been established with the object of interest (e.g., either directly or indirectly), the user may understand information about the object of interest and possibly conduct a transaction, e.g., make purchases (e.g., buying a bus pass). In that regard, dynamic, real time information about the captured object or area may be displayed on the AR device. The information may be shared about the target object or area, for example, via wireless networks or other technologies such as IR, readable codes, etc. such that the user of the AR device may immediately determine information relevant to the user's particular needs or situation.

In the example described above with respect to FIG. 1 involving a bus stop, the GPS component of a user's AR device may track the GPS location of the user to a bus stop. Thus, the system knows that the user is located at a bus stop. When the user points his or her AR device (e.g., smart phone) in the direction of an oncoming bus, an image may be captured and deconstructed. The image may include various items such as a metro bus, some trees in the background, traffic lights, etc., but because the user is at a bus stop, the system may determine that the metro bus is most likely the object of interest. In another embodiment, the user may also have a personal calendar appointment such as "be at the downtown office at 8:30 am." In that case, the system may determine that the user is at a bus stop, in the morning, and has an appointment downtown, thus, the system may determine that the user is most likely trying to get downtown. In other embodiments, any other relevant objects in the captured image view may be deconstructed and presented to the user. For example, if there is also a coffee shop, e.g., a Starbucks™ location across the street from the bus stop that ends up in the user's captured image view from his or her AR device, the user may have the option of receiving related information about the coffee shop.

Furthermore, with respect to the bus stop example, the system may determine that the AR device has captured an image of the approaching bus. The bus itself may be transmitting related information, for example status information such as a current route, number of people on board, fare price, etc. In this regard, the bus may transmit information via a network such as WiFi or 4G (i.e., long range technologies that may be picked up by the metro city bus service) such that when the AR device captures an image view including a bus, image recognition may be used to determine that this is a metro city bus. The system may resolve other information about the bus, for example, routes, fare prices, the type of bus, etc., from specific bus service information, for example, information provided by either the metro bus website, or from an API that the system may tap into to get general information about the bus. Web scraping may also be used. According to one or more embodiments herein, real time information about an object of interest (e.g., "this is the current route of the bus", "this many people are on board at this exact moment", etc.) may be resolved by the system communicating with the object of interest, e.g., the metro bus itself. In an embodiment, the system may figure out how to obtain information from the metro bus by knowing the user's current location, approximating the bus's current location by using the user's location and figuring out the distance from the user, and then tapping into the general information about the metro bus routes from the metro bus website, for example. Therefore, the exact point in time when the AR device captures an image view including the bus, e.g., the user takes a picture of the bus, the exact bus may be determined, and thus the user may find out related information about the oncoming bus. Once the exact metro bus has been determined, the user may be able to interact with the bus as if the user were already on the bus, for example, the user may conduct a transaction such as purchasing a ticket if needed for the bus, etc.

In one or more embodiments, a transaction may be processed using the AR device in connection with a target object or area based, at least in part, on the real time information communicated by the target object or area. For example, if a user of the AR device receives information about a particular bus route or destination and fare, the user may purchase a ticket to ride the bus using his or her AR device. Thus, the user may identify the correct bus, purchase a bus ticket and board the bus in a seamless manner.

Figure 4:
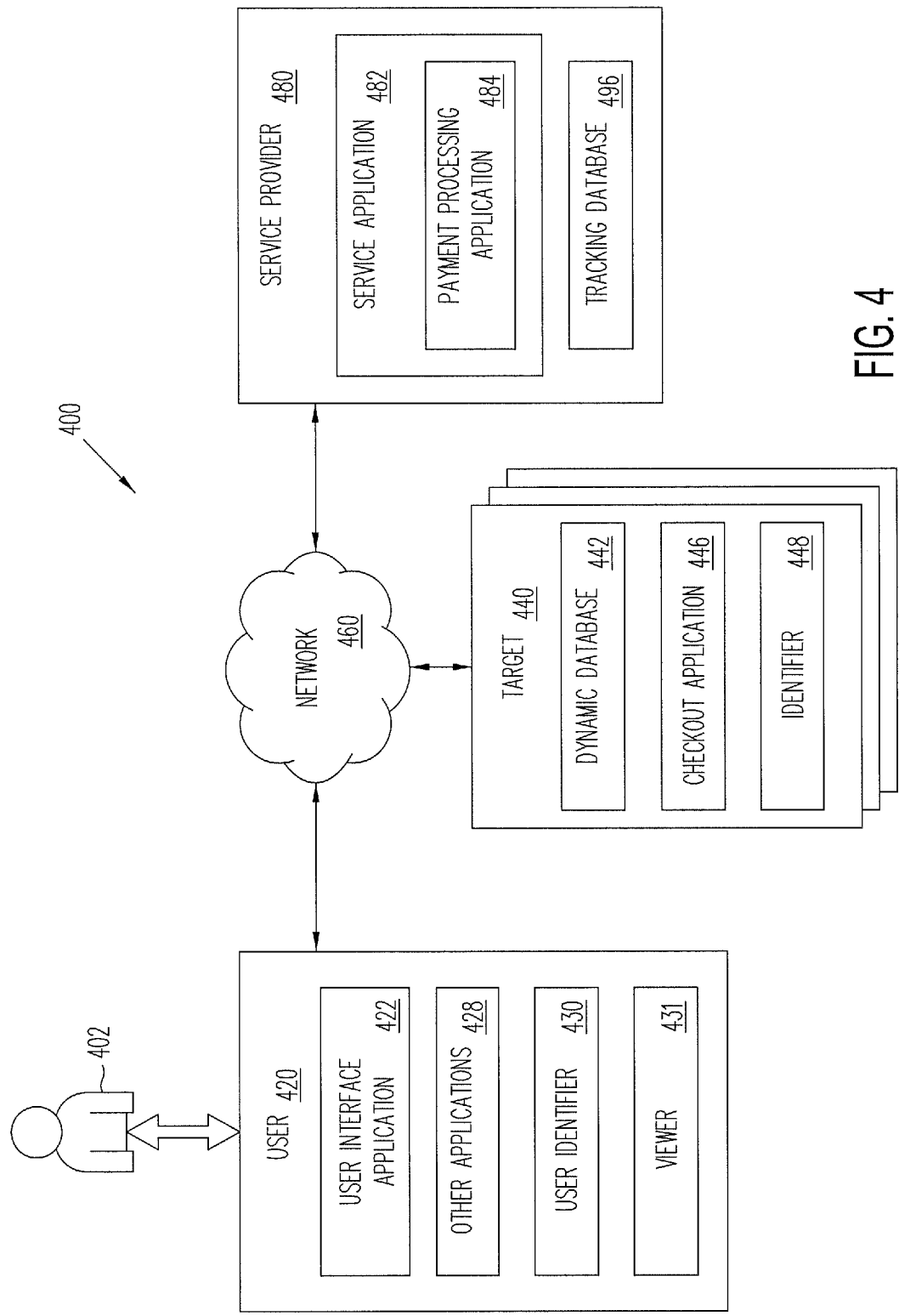
FIG. 4 is a block diagram illustrating a system for using augmented reality to determine information according to an embodiment of the present disclosure.

Referring now to FIG. 4, a block diagram of a system 400 adapted to use augmented reality to determine information is illustrated according to an embodiment of the present disclosure. As shown in FIG. 4, the system 400 includes at least one AR device 420 (e.g., network computing device), one or more servers or devices 440 associated with one or more target objects, areas or zones (e.g., network server devices), and at least one service provider server or device 480 (e.g., network server device) in communication over a network 460.

Network 460, in one embodiment, may be implemented as a single network or a combination of multiple networks. For example, in various embodiments, the network 460 may include the Internet and/or one or more intranets, cloud, landline networks, wireless networks, and/or other appropriate types of communication networks. In another example, the network 460 may comprise a wireless telecommunications network (e.g., cellular phone network) adapted to communicate with other communication networks, such as the Internet. As such, in various embodiments, the AR device 420, servers or devices 440 associated with a target object or area, and service provider server or device 480 may be associated with a particular link (e.g., a link such as a URL (Uniform Resource Locator) to an IP (Internet Protocol) address).

The AR device 420, in various embodiments, may be implemented using any appropriate combination of hardware and/or software configured for wired and/or wireless communication over the network 460. In various examples, the AR device 420 may be implemented as a wireless telephone (e.g., cellular, mobile, etc.), a smart phone, a tablet, a personal digital assistant (PDA), a personal computer, a notebook computer, and/or various other generally known types of wired and/or wireless computing devices. It should be appreciated that the AR device 420 may be referred to as a client device, a mobile device, or a user device without departing from the scope of the present disclosure.

The AR device 420, in one embodiment, includes a user interface application 422, which may be utilized by the user 402 to conduct transactions such as financial transactions (e.g., shopping, purchasing, bidding, etc.) with the service provider server 480 over the network 460. In one aspect, purchase expenses may be directly and/or automatically debited from an account related to the user 402 via the user interface application 422.

In one implementation, the user interface application 422 comprises a software program, such as a graphical user interface (GUI), executable by a processor that is configured to interface and communicate with the service provider server 480 via the network 460. In another implementation, the user interface application 422 comprises a browser module that provides a network interface to browse information available over the network 460. For example, the user interface application 422 may be implemented, in part, as a web browser to view information available over the network 460. In another example, the user 402 is able to access data or information associated with a target object or area via the one or more servers or devices 440 to view information such as schedules, destinations, locations, descriptions, etc. about a target object as well as select items and/or services for purchase, and the user 402 is able to purchase items and/or services associated with the target object or area from the one or more servers or devices 440 via the service provider server 480. Accordingly, the user 402 may conduct transactions such as financial transactions (e.g., view, purchase and pay for items and/or services) from the one or more servers or devices 440 via the service provider server 480.

The AR device 420, in various embodiments, may include other applications 428 as may be desired in one or more embodiments of the present disclosure to provide additional features available to the user 402. In one example, such other applications 428 may include security applications for implementing client-side security features, programmatic client applications for interfacing with appropriate application programming interfaces (APIs) over the network 460, and/or various other types of generally known programs and/or software applications. In still other examples, the other applications 428 may interface with the user interface application 422 for improved efficiency and convenience.

According to one or more embodiments, the user interface application 422 or the other applications 428 may include an application that may be loaded on AR device 420 from service provider server 480, from a server 440 associated with a target object or area, or from any other appropriate party. Such application enables AR device 420 to use augmented reality to determine information. A viewer 431 of AR device 420, for example, a user interface, an image or video capturing component (e.g., a camera), a display, a screen, etc. may be used to look at or view a target object or area for which information may be desired. AR device 420 may receive information provided, e.g., broadcasted, from a target object or area, for example, by using WiFi as nearby target objects are located in a proximity of the AR device 420, such as in front of a hotspot WiFi, WiMax, Bluetooth range, NFC, or the like. In addition, pertinent information may be uploaded, for example, the locations of nearby transport vehicles, fares, schedules, etc. to a tracking database 496 of service provider server 480 or to a dynamic database 442 of server 440 associated with a target object or area.

In various embodiments, the information received by AR device 420 (having the downloaded application) may supplement information generally or publically known about a target object or area. As such, a method and system for using augmented reality to determine information is provided. AR device 420 may be used to gather information about signals (e.g., radio signals) transmitted by a target object or area, moving or stationary. Raw signal strength information along with known locations of the AR device may be used to determine information such as distances between an AR device and a target object.

In an embodiment, AR device 420 may include at least one user identifier 430, which may be implemented, for example, as operating system registry entries, cookies associated with the user interface application 422, identifiers associated with hardware of the AR device 420, or various other appropriate identifiers. The user identifier 430 may include one or more attributes related to user 402, such as personal information related to user 402 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, user identifier 430 may be passed with a user login request to the service provider server 480 via the network 460, and the user identifier 430 may be used by the service provider server 480 to associate the user 402 with a particular user account maintained by the service provider server 480.

The one or more servers or devices 440 associated with a target object or area, in various embodiments, may be maintained by one or more individuals or business entities, profit or non-profit (or in some cases, by a partner of a business entity that processes transactions on behalf of business entities). It should be appreciated that individuals or business entities may include, for example, providers of transport vehicles (public or private), delivery vehicles, merchants such as vehicles offering items for sale (e.g., food, ice cream, etc.), retail stores, resource information locations, utility locations, real estate management locations, etc., which may offer various items and/or services for purchase and payment.

As such, each of the one or more servers 440 associated with a target object or area may include a dynamic database 442 for maintaining, tracking, updating and/or identifying information related to their target objects or areas, which users may view via their associated AR devices. In various embodiments, the information may be managed in several ways, for example, a long range communication network may be used, information may be stored in the cloud, or it may be managed by a service.

Each of the servers or devices 440 associated with a target object or area, in one embodiment, may include a checkout application 446, which may be configured to facilitate financial transactions (e.g., purchase transactions) by the user 402 of items and/or services offered by an individual or business entity associated with the target object. As such, in one aspect, the checkout application 446 may be configured to accept payment information from the user 402 over the network 460.

Each of the servers or devices 440 associated with a target object or area, in one embodiment, may include at least one identifier 448, which may be included as part of the one or more items and/or services made available for purchase so that, e.g., particular items and/or services are associated with particular individual sellers or business entities. In one implementation, an identifier 448 may include one or more attributes and/or parameters related to an individual or business entity, such as business and banking information. User 402 may conduct transactions such as financial transactions (e.g., selection, monitoring, purchasing, and/or providing payment for items and/or services) with each server 440 via the service provider server 480 over the network 460.

The service provider server 480, in one embodiment, may be maintained by a transaction processing entity, which may provide processing for financial transactions and/or information transactions between the user 402 and one or more of the servers 440 associated with a target object or area. As such, the service provider server 480 includes a service application 482, which may be adapted to interact with each AR device 420 and/or each server 440 over the network 460 to facilitate the selection, purchase, and/or payment of items and/or services by the user 402 from one or more of the servers 440. In one example, the service provider server 380 may be provided by PayPal®, Inc. and/or eBay®, Inc. of San Jose, Calif., USA.

The service application 482, in one embodiment, utilizes a payment processing module 484 to process purchases and/or payments for financial transactions between the user 402 and each of the servers 440. In one implementation, the payment processing module 484 assists with resolving financial transactions through validation, delivery, and settlement. As such, the service application 482 in conjunction with the payment processing module 484 settles indebtedness between the user 402 and each of the servers 440, wherein accounts may be directly and/or automatically debited and/or credited of monetary funds in a manner as accepted by the banking industry.

The system described above with respect to the embodiment of FIG. 4 may be provided for using augmented reality to determine information such as information associated with a target object, area or zone, moving or stationary.

FIG. 4 illustrates an exemplary embodiment of a network-based system 400 for implementing one or more processes described herein. As shown, network-based system 400 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 4 may be deployed in other ways and that the operations performed and/or the services provided by such servers may be combined or separated for a given implementation and may be performed by a greater number or fewer number of servers. One or more servers may be operated and/or maintained by the same or different entities.

Figure 5:
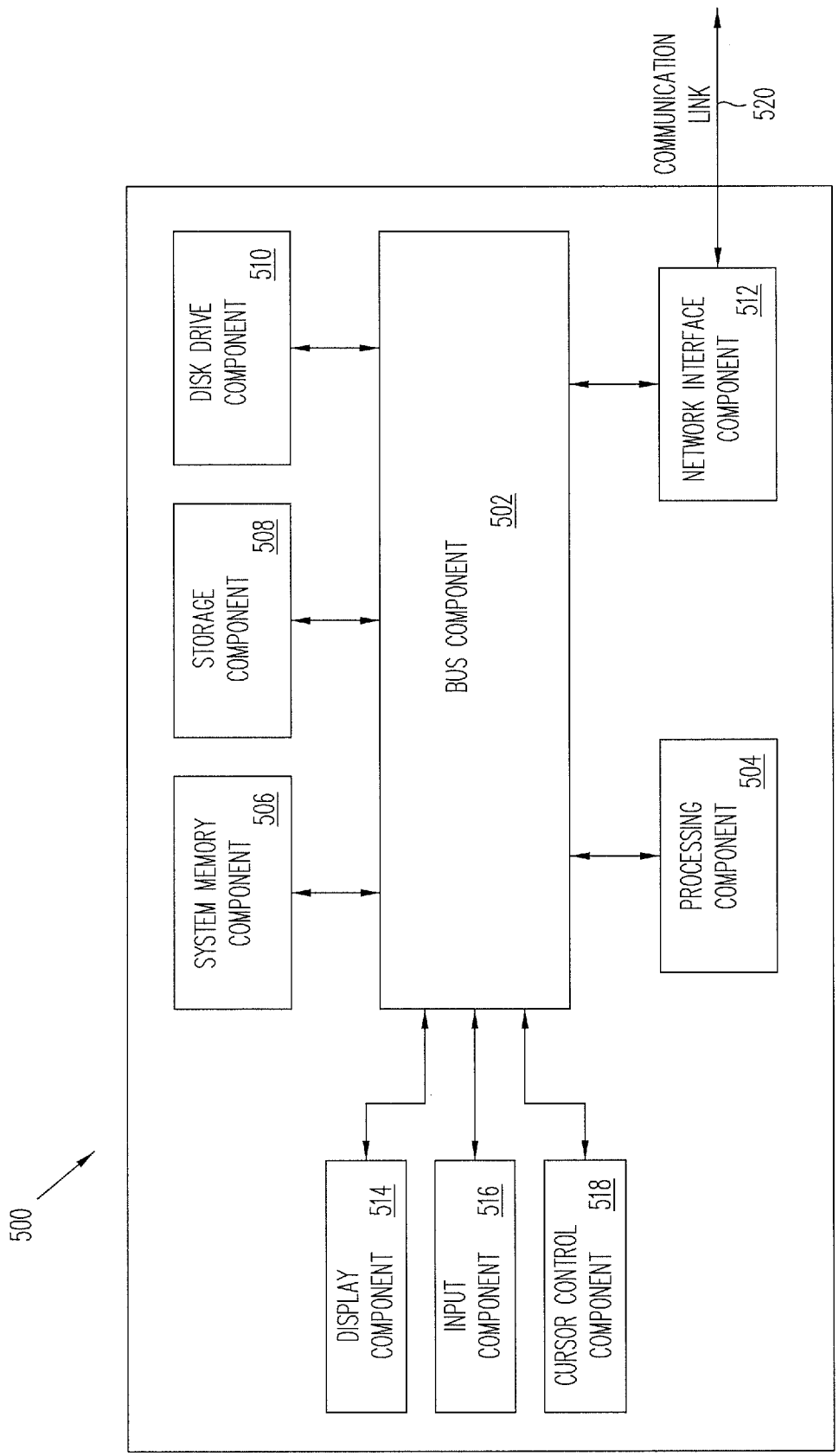
FIG. 5 illustrates a block diagram of a system for implementing a device according to one embodiment of the present disclosure.

FIG. 5 illustrates a block diagram of a system 500 suitable for implementing embodiments of the present disclosure. System 500 may include or be a part of an AR device such as AR devices 104 illustrated in FIGS. 1-1A, AR device 204 illustrated in FIG. 2, or AR device 420, one or more servers or devices 440, and service provider server or device 480 illustrated in FIG. 4. System 500, such as part of a cell phone, mobile phone, smart phone, tablet, personal computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display or viewer component 514 (or alternatively, an interface to an external display), an input component 516 (e.g., a sensor, keypad or keyboard), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to process financial transactions, make payments, etc. In other embodiments, hard-wired circuitry may be used in place of or in combination with software instructions for implementation of one or more embodiments of the disclosure.

Logic may be encoded in a non-transitory computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for payments or transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., network 460 of FIG. 4, LAN, WLAN, PTSN, or various other wired or wireless networks) may perform instruction sequences to practice the disclosure in coordination with one another. System 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

Although various components and steps have been described herein as being associated with, for example, AR device 420, seller server 440, and payment service provider server 480 of FIG. 4, it is contemplated that the various aspects of such servers illustrated in FIG. 4 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in form and detail without departing from the scope of the disclosure. Thus, the disclosure is limited only by the claims.

What is claimed is:

1. A system comprising:
a non-transitory memory storing the image view; and
one or more hardware processors coupled to the non-transitory memory and configured to access the image view from the non-transitory memory and to execute instructions to cause the system to perform operations comprising:
capturing, using an image capturing device, an image of a plurality of objects in an environment associated with a user;
identifying, among the plurality of objects in the image, a vehicle that is associated with the user;
establishing a wireless connection with the vehicle based on an identifier associated with the vehicle;
presenting an interface for initiating an electronic payment transaction with the vehicle;
in response to receiving an input via the interface, performing the electronic payment transaction with the vehicle via the wireless connection;
providing a first indication of a first stop along a route of the vehicle to a destination location associated with the user;
detecting, based on data received via the wireless connection, a change to the route of the vehicle; and
in response to detecting the change, displaying a second indication of a second stop along the changed route of the vehicle to the destination location.

2. The system of claim 1, wherein the operations further comprise:
obtaining real-time status information from the vehicle via the wireless connection, wherein the change to the route is detected based on the real-time status information.

3. The system of claim 1, wherein the operations further comprise determining the route of the vehicle.

4. The system of claim 1, wherein the performing the electronic payment transaction with the vehicle comprises transmitting payment information to the vehicle via the wireless connection.

5. The system of claim 1, wherein the operations further comprise:
obtaining a series of images of the vehicle; and
determining, based on the series of images, that the vehicle is approaching the user, wherein the interface for initiating the electronic payment transaction is presented in response to determining that the vehicle is approaching the user.

6. The system of claim 1, wherein the operations further comprise:
presenting, on a display, the image; and
overlaying the interface on the image presented on the display.

7. The system of claim 1, wherein the operations further comprise:
obtaining real-time status information from the vehicle via the wireless connection; and
presenting the real-time status information on a viewer of a device.

8. A method comprising:
obtaining, by one or more hardware processors, one or more images corresponding to a scene associated with a device viewer;
identifying, by the one or more hardware processors among a plurality of objects appeared in the one or more images, a particular vehicle;
establishing, by the one or more hardware processors, a wireless connection with the particular vehicle;
providing, by the one or more hardware processors on the device viewer, a first indication of a first stop along a route of the particular vehicle to a destination location associated with the user;
detecting, by the one or more hardware processors based on data received via the wireless connection, a change to the route of the particular vehicle; and
in response to detecting the change, displaying, by the one or more hardware processors on the device viewer, a second indication of a second stop along the changed route of the particular vehicle to the destination location.

9. The method of claim 8, wherein the wireless connection comprises at least one of an infrared connection, a WiFi connection, or a Bluetooth connection.

10. The method of claim 8, further comprising:
providing, on the device viewer, an indication of the particular vehicle.

11. The method of claim 8, further comprising:
determining that the particular vehicle is associated with the user;
identifying a loading zone associated with the particular vehicle; and
providing, on the device viewer, directions for directing the user to the loading zone.

12. The method of claim 8, wherein the particular vehicle is determined based on the destination location associated with the user.

13. The method of claim 8, further comprising:
initiating a payment transaction by transmitting, via the wireless connection, payment information associated with the user to the particular vehicle.

14. The method of claim 8, further comprising:
obtaining second one or more images corresponding to an interior of the particular vehicle;
identifying an item appeared in the second one or more images;
presenting, on the device viewer, an interface for initiating a payment transaction for a purchase of the item; and
in response to receiving an input from the interface, performing the payment transaction by transmitting payment information associated with the user to the particular vehicle via the wireless connection.

15. A non-transitory machine-readable medium having stored thereon machine-readable instructions executable to cause a machine to perform operations comprising:
obtaining an image corresponding to a device viewer of a device;
identifying, among a plurality of objects in the image, a vehicle that is associated with the user;
establishing a wireless connection with the vehicle based on an identifier associated with the vehicle;
presenting, on the device viewer, an interface for initiating an electronic payment transaction with the vehicle;
in response to receiving an input via the interface, performing the electronic payment transaction with the vehicle via the wireless connection;
providing a first indication of a first stop along a route of the vehicle to a destination location associated with the user;
detecting, based on data received via the wireless connection, a change to the route of the vehicle; and in response to detecting the change, displaying a second indication of a second stop along the changed route of the vehicle to the destination location.

16. The non-transitory machine-readable medium of claim 15, wherein the operations further comprise:
obtaining real-time status information from the vehicle via the wireless connection; and
overlaying the real-time status information on the device viewer.

17. The non-transitory machine-readable medium of claim 15, wherein the operations further comprise:
in response to identifying the vehicle in the image, presenting, on the device viewer, an indication of the vehicle.

18. The non-transitory machine-readable medium of claim 15, wherein the operations further comprise:
obtaining a second image corresponding to an interior of the vehicle;
identifying an object in the second image;
presenting, on the device viewer, a second interface for initiating a second electronic payment transaction for a purchase of the object; and
in response to receiving an input from the second interface, performing the second payment transaction by transmitting payment information associated with the user to the vehicle via the wireless connection.

19. The non-transitory machine-readable medium of claim 15, wherein the device comprises a pair of smart glasses.

20. The non-transitory machine-readable medium of claim 15, wherein the vehicle is a public transport vehicle.

* * * * *